July , 1924.

F. STARR

CHILD'S OCCUPANT PROPELLED VEHICLE

Filed Oct. 28, 1922   2 Sheets-Sheet 1

1,500,854

INVENTOR.
Fred Starr
BY M. C. Frank
ATTORNEY

July 8, 1924.

F. STARR 1,500,854

CHILD'S OCCUPANT PROPELLED VEHICLE

Filed Oct. 28, 1922       2 Sheets-Sheet 2

INVENTOR.
Fred Starr
BY M. C. Frank
ATTORNEY

Patented July 8, 1924.

1,500,854

UNITED STATES PATENT OFFICE.

FRED STARR, OF OAKLAND, CALIFORNIA.

CHILD'S OCCUPANT-PROPELLED VEHICLE.

Application filed October 28, 1922. Serial No. 597,483.

*To all whom it may concern:*

Be it known that I, FRED STARR, a citizen of the United States, residing at Oakland, in the county of Alameda and State of California, have invented a new and useful Child's Occupant-Propelled Vehicle, of which the following is a specification.

This invention relates in general, to vehicles for children, and in particular, to a vehicle of this character propelled by the occupant.

The main object of the invention, is to enable the rider using the vehicle to easily propel it and himself, or herself, in either direction and at will.

The invention, therefore, includes a wheeled vehicle having a seat, a driving mechanism connected to one of the axles, a sprocket wheel on said axle, a chain and other members.

Other objects and features of construction, will appear in the subjoined description of the accompanying sheet of drawings, in which.

Figure 1:
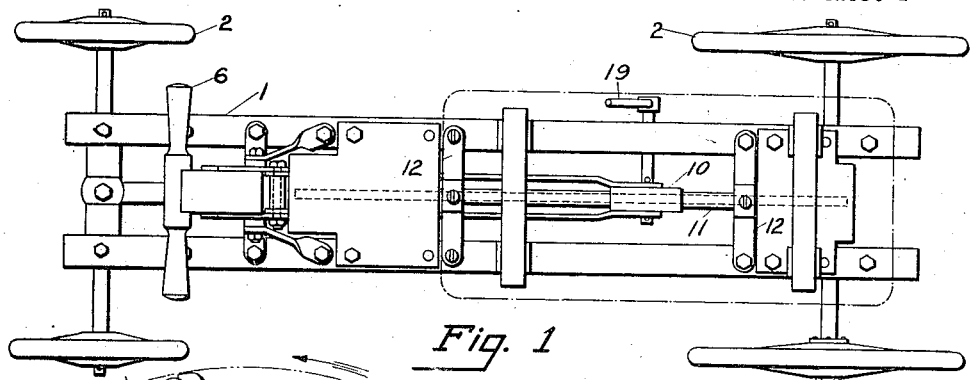
Figure 1 is a plan view of my vehicle, and Figure 2 a side elevation of it.
Figure 2:
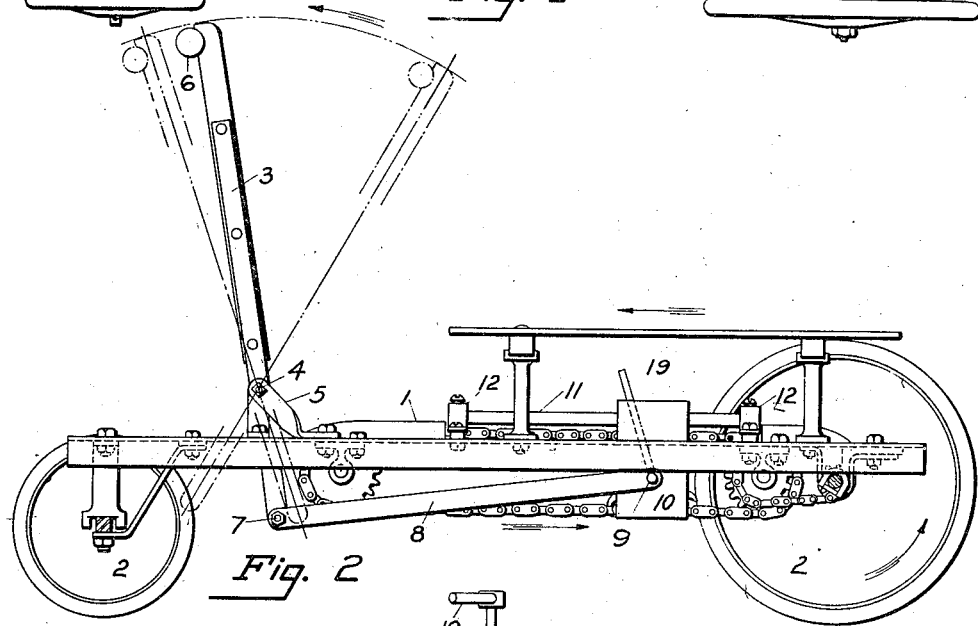
Figure 3:
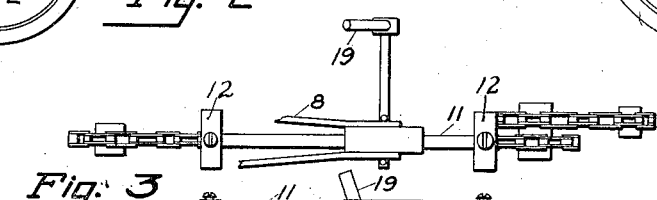
Figure 3 shows on an enlarged scale, a plan view of a chain and sprocket drive.

In the figures: The frame of the vehicle is represented by the numeral 1, and 2 the wheels therefor.

A lever 3 pivoted at 4 to the frame, stands up in a position suitable to the rider. The pivotal point may be on a bracket 5 attached thereto for the purpose. At the top of the lever is a cross-handle 6, which serves for convenient oscillation of the lever. At a desired point on the lever, in the present instance near its lower end and below the frame, as at 7, is pivoted a pitman or rod 8, which at its other end 9 is connected to a cross-head 10.

This cross-head is supported and guided on a guide bar 11, and which latter is supported in brackets 12 on the frame. Thus the cross-head may be reciprocated between limits, by the oscillation of the lever.

Figure 4:
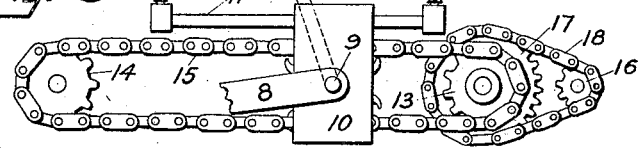
Figure 4 is a side elevation of it.

In the form shown in Fig. 4, two sprocket wheels 13 and 14, one of which as 14 is an idler, are engaged by a chain belt 15 running thereover. The active sprocket wheel 13 is connected to the axle of the rear wheels by a multiplying or speed gear, consisting of a sprocket pinion 16 operatively connected to a sprocket wheel 17 on the same arbor as wheel 13 by a chain 18.

Figure 5:
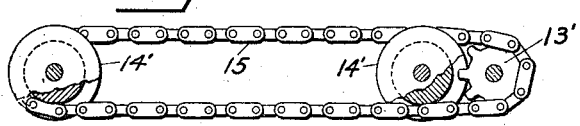
Figure 5 is a side elevation and partly in section, of a chain and sprocket drive over flanged pulleys.

In the form shown in Fig. 5, the active sprocket wheel 13', is driven by the chain belt 15 passing over plain, flanged, idler, guide wheels 14', of equal diameter for parallel travel of said chain belt between said guide wheels.

The cross-head 10 embraces the chain 15, and is provided with dogs or pawls which engage the chain. These pawls are specifically shown and described in a co-pending application for transmission mechanisms, filed October 28, 1922, Serial No. 597,484.

Figures 6, 7:
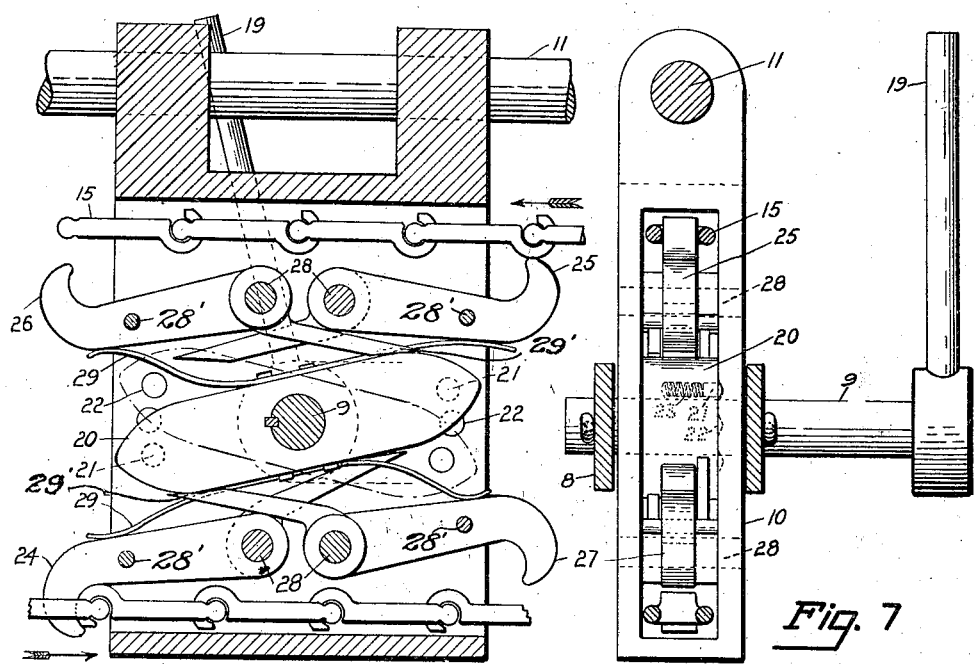
Fig. 6 is a partial sectional elevation of the operating parts of the apparatus controlling the direction of movement of the chain belt.
Fig. 7 is an end elevation of the parts, also partly shown in section.
Figure 8:
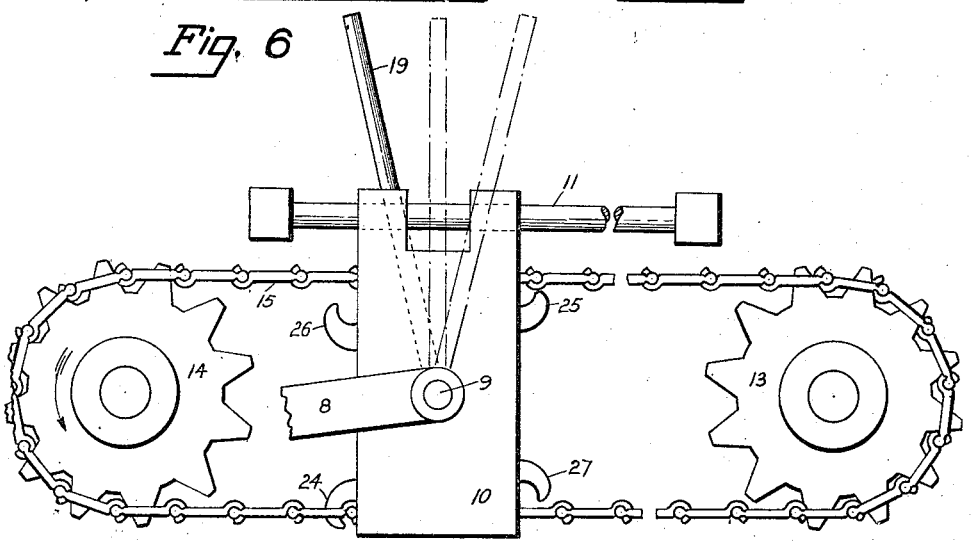
Fig. 8 is a side elevation of the operating parts of Fig. 6 in engagement with the chain belt.

Between the sides or walls of the cross-head and between the limbs of the link-belt, is an oscillating head 20 mounted on the same shaft 9, that supports and pivots the rod 8. This head is keyed to the said shaft and the latter projects laterally from the cross-head, as seen in Figure 7.

The lever 19 is secured to the shaft 9, by which the head 20 may be oscillated between two extremes, it being held in the position to which it is moved by catch bolts 21, engaging countersunk stops 22 into which they are projected by springs 23.

Pawls of hook form 24, 25, 26 and 27 are pivoted in fixed relation to the cross-head 10, as at 28. Each of the pawls is provided with an integral tail piece 29', normally contacting the head 20 which limits its movement toward the belt. Springs 29, which may be plain flat springs as shown, or otherwise, are secured to the head 20 and press said pawls toward the belt.

The arrangement of the pawls in the cross-head is such, that supposing the vehicle and the cross-head to be moving forward, then the upper limb of the chain is grasped by the right-hand upper pawl, and when the cross-head moves backward, the vehicle still moving forward, the lower limb of the chain will be grasped by the left-hand lower pawl as shown in the figures. When the short hand-lever 19 is moved backward by the rider, the other two pawls, alternately, engage the chain belt and the vehicle moves backward, and continuing so until the hand lever 19 is again moved forward. In the meantime the lever 3 is simply oscillated as usual, causing a constant reciprocation of the cross-head, which latter pulls the chain and drives the vehicle in the direction desired. In coasting, the rear-axle sprocket drives the chain belt, the links of the latter slipping over the pawls, the cross-head and lever 3 remaining stationary.

Each pawl, remote from its pivot 28, has a pin 28' secured thereto, Fig. 6, to serve as an outer bearing between the walls of the cross-head for guiding the hooks into the links of the chain.

Having thus illustrated and described my invention, I wish it understood that the same may be modified from time to time as practice suggests. Therefore, the patent protection that I desire, is all of that which comes within the spirit and scope of the invention as claimed.

I claim:

1. An occupant-propelled vehicle, comprising, in combination, a wheeled frame, an upstanding lever pivotally mounted on said frame, and adapted to be oscillated by the rider thereof, a chain and sprocket drive applied to the rear axle of said frame, and a connection between said lever and said chain whereby the oscillation of said lever rotates said chain, and means to reverse the direction of travel of said chain.

2. A vehicle, comprising, in combination, a wheeled frame, a pivoted upstanding lever on said frame, a cross-head and guide therefor, a pitman connecting said lever to said cross-head, whereby the oscillation of the lever is adapted to reciprocate said cross-head, a chain and sprocket drive, said chain embraced by said cross-head, and means applied to said cross-head and adapted to engage said chain and drive the same when the cross-head is reciprocated, and means to reverse the direction of travel of said chain.

3. A vehicle, comprising, in combination, a wheeled frame, an idler wheel near the forward end of said frame, a sprocket wheel near the rear end of said frame and secured to the rear axle of the vehicle, a chain passing over said wheels and engaging the same, and means adapted to force the revolution of said chain to drive said sprocket wheel, and means to reverse the direction of revolution of said chain.

4. In an occupant-propelled vehicle, a chain-belt drive consisting of an active sprocket wheel and a pair of sprocket wheels of equal diameter, for parallel travel of said belt between said pair of wheels, means for imparting a continued forward movement to said chain drive and means for reversing said movement.

In testimony whereof I affix my signature.

FRED STARR.